United States Patent [19]

Omata

[11] Patent Number: 4,565,266
[45] Date of Patent: Jan. 21, 1986

[54] OIL TYPE DAMPER

[75] Inventor: Nobuaki Omata, Yokohama, Japan

[73] Assignee: Nifco Inc., Yokohama, Japan

[21] Appl. No.: 605,517

[22] Filed: Apr. 30, 1984

[51] Int. Cl.⁴ .............................................. F16D 57/00
[52] U.S. Cl. .................................. 188/322.5; 188/290
[58] Field of Search ............... 188/130, 268, 276, 290, 188/293, 322.5

[56] References Cited

U.S. PATENT DOCUMENTS 1,675,760  7/1928  Manzel ............................ 188/290 X
3,861,503  1/1975  Nash ............................... 188/290 X

FOREIGN PATENT DOCUMENTS 1425932  2/1976  United Kingdom ............ 188/322.5

Primary Examiner—Duane A. Reger
Attorney, Agent, or Firm—J. R. Halvorsen; T. W. Buckman

[57] ABSTRACT

An oil type damper comprises a cylindrical wall formed integrally with a base secured on a given machine, a cap set in place rotatably within the cylindrical wall and integrated with a toothed wheel, a seal disk forming a housing in combination with the cap, and oil filling the interior of the housing. The integration of the toothed wheel and the cap decreases the number of component parts, reduces the time and labor involved in assembly, and permits size reduction of the damper.

3 Claims, 7 Drawing Figures

OIL TYPE DAMPER

BACKGROUND OF THE INVENTION

This invention relates to an oil type damper which relies on the viscosity of oil to brake the opening or closing motion of, for example, a lid in some type of machine.

In a cassette tape recorder or a video tape recorder, for example, there is used a damper for braking the sudden release motion of the lid of a cassette tape holder during the opening or closing of the tape holder for the purpose of abating impacts generated during the release motion.

The damper of this kind generally comprises a base adapted to be secured on the body of a given machine and a rotor accommodated rotatably within the base and adapted to receive the rotational opening or closing motion of a lid of a cassette holder, for instance. The methods for applying a braking action on the rotation of the rotor relative to the base are broadly divided into the frictional contact method and the method making use of the viscosity of an oil such as silicone oil. Of these two types, the oil type proves more desirable in terms of durability of the damper and the sensation perceived by the user during the operation of the damper.

Generally, the oil type damper comprises a cylindrical base, a rotor accommodated in the cylindrical base, and a number of other parts including a cap and a toothed wheel connected to the rotor. The fact that the number of component parts is large implies that the oil type damper is expensive. Moreover, the oil type damper is quite bulky and requires considerable time and labor to assemble. There is also a possibility that because of mismatching between component parts, the completed oil type damper will have unwanted play and consequently suffer from poor operational precision.

SUMMARY OF THE INVENTION

An object of this invention, therefore, is to provide an oil type damper which has a reduced number of component parts, employs a toothed wheel with the minimum possible thickness, and has no need for a boss on its cap and which, therefore, enjoys great ease of assembly, has such extremely small overall height that it can be fit in a space smaller than that required for a conventional oil type damper and has utility in an expanded range of applications.

The object described above is accomplished by providing an oil type damper which comprises a base having means to be secured on a given machine, a blind cylindrical wall formed integrally with the base, a cap fitted within the cylindrical wall and rotatably retained therein, a seal disk forming a housing in combination with the cap, and oil filling the housing.

In the oil type damper of this invention, a toothed wheel serving to receive the rotational opening or closing motion of the lid is formed integrally with the cap, the cap forms the housing in combination with the seal disk, and the cap is rotatably retained within the cylindrical wall. Owing to this arrangement, the oil type damper comprises a smaller number of component parts than the conventional counter-type having the toothed wheel and the cap formed independently of each other, requires less time and labor for its assembly, and has a very flat thin structure which allows it to be fitted into an extremely narrow space.

The other objects and characteristics of the present invention will become apparent from the further disclosure of the invention given in the following detailed description of preferred embodiments, with reference to the accompanying drawings.

DESCRIPTION OF THE PREFERRED EMBODIMENTS

Figure 1:
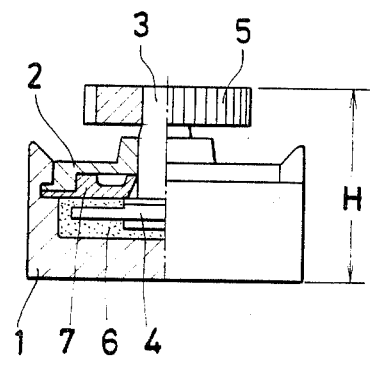
FIG. 1 is a cross section of a conventional damper.

FIG. 1 illustrates a conventional oil type damper. It comprises a blind cylindrical wall 1 formed integrally with a base adapted to be secured on a given machine by suitably known means, a cap 2 fixed in place by being snapped into an open end part of the cylindrical wall 1 and adapted to form a housing in combination therewith, a rotor 4 rotatably accommodated in the housing with a shaft 3 thereof extending through a central hole of the cap 2, a toothed wheel 5 fastened to the leading end of the shaft 3 extending out of the central hole of the cap 2, and a flexible seal disk 7 fitted around the shaft 3 and adapted to have the outer boundary thereof fixed in conjunction with the cap 2 to the cylindrical wall 1 so as to prevent oil from leaking out through the gap between the cap and the cylindrical wall. Since the conventional oil type damper comprises numerous component parts as described above, it requires much time for assembly. Since the toothed wheel 5 is set in place by being fitted on the shaft, it requires a certain degree of thickness. Since the cap is required to have a boss raised around its central hole for the purpose of preventing the shaft from producing unwanted play, the extent to which the overall height H of the damper can be decreased is limited. Thus, the portion in which the damper is secured is required to have a space larger than the overall height H.

This invention, therefore, forms the cap integrally with the toothed wheel to decrease the number of component parts and, at the same time, reduce the thickness of the toothed wheel to the fullest extent possible, and eliminates the boss of the cap to facilitate the assembly and decrease notably the overall height of the damper. Consequently, the oil type damper of this invention can be fastened even in a space too small for the conventional oil type damper. Thus, it will find utility in a wider range of applications. Now, the first embodiment of this invention will be described with reference to FIGS. 2-4.

By 11 is denoted a cap having a toothed wheel 12 formed integrally with the upper surface thereof. The outside diameter of a peripheral wall 11' of the cap 11 is greater than the outside diameter of the toothed wheel. The cap 11 is provided at the lower end of the outer surface of the peripheral wall thereof with an outwardly extended flange 13. As this cap 11 is pushed down into a blind cylindrical wall 15 formed integrally with a base 14, it advances past check claws 15' formed on the cylindrical wall while bending the check claws backwardly. The check claws then resume their original shape and position and rotatably retain the cap 11 inside the cylindrical wall 15 and prevent it from being drawn out upwardly. The base 14 includes means for fastening it to a machine with which it is functionally associated, i.e. the lid of a cassette holder. In this embodiment the fastening means are formed by at least one laterally extending apertured flange 14'.

Before this cap is set in the cylindrical wall, a stationary disk 16 is placed inside the cap and a seal disk 17 is attached fast to the lower side of the cap to cover the lower side. In this case, oil 18 is applied in advance to the opposite sides and the peripheral surface of the stationary disk 16 and/or the inner side of the cap, and the side of the seal disk opposed to the stationary disk.

Figure 2:
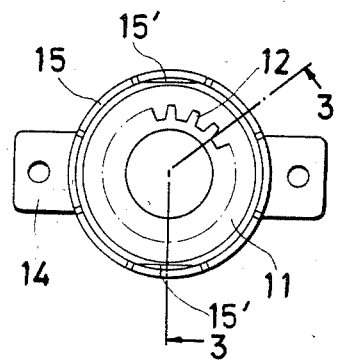
FIG. 2 is a front view of one embodiment of a damper of the present invention.
Figure 3:
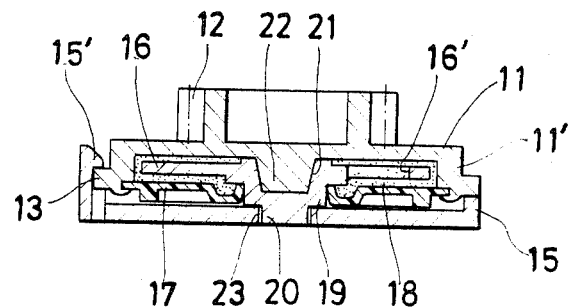
FIG. 3 is a cross section of the damper as viewed along line 3—3 of FIG. 2.
Figure 4:
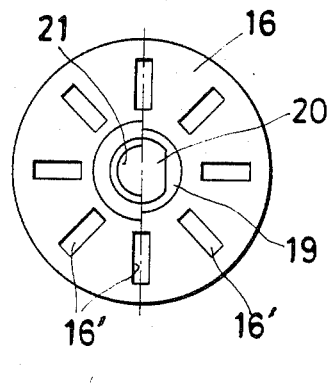
FIG. 4 is an explanatory diagram of a stationary disk in the damper of FIG. 2, illustrating a top view thereof in one half and a bottom view thereof in the other half.

In the embodiment illustrated in FIGS. 2-4, the stationary disk 16 is provided at the center thereof with a projecting shaft 19 of a circular cross section fitting the central hole of the seal disk and a shaft 20 of a non-circular cross section smaller than the profile of the projecting shaft 19 extending from the projecting shaft 19. The projecting shaft 19 has a depression 21. Into this depression 21 is fitted a protuberance 22 which rises from the center of the inner side of the cap.

The oil type damper of this embodiment, therefore, is assembled by setting in place within the cap the stationary disk coated in advance with oil and, at the same time, fixing the seal disk as by swaging to the lower surface of the cap, and pushing down the cap into the cylindrical wall with the direction of the non-circular shaft 20 adjusted to that of an identically shaped non-circular hole 23 formed at the center of the base 14 surrounded by the cylindrical wall. The non-circular shaft 20 of the stationary disk does not rotate because it extends into the non-circular hole of the base. When the cap is rotated in conjunction with the seal disk by the rotational input from the lid being damped, this rotation is braked by the oil intervening between the stationary disk, the inner surface of the cap, and the seal disk. Further since the cap has the protuberance 22 on the inner side thereof fitted into the depression 21 of the stationary disk 16, the cap, the stationary disk, and the base are concentrically positioned relative to one another and the inner wall of the center hole in the seal disk fits around the outer boundary of the projecting shaft 19 to form a seal for preventing oil leakage. When the oil is thermally expanded, the seal disk deforms in a swelling manner and absorbs the thermal expansion of the oil.

Figure 5:
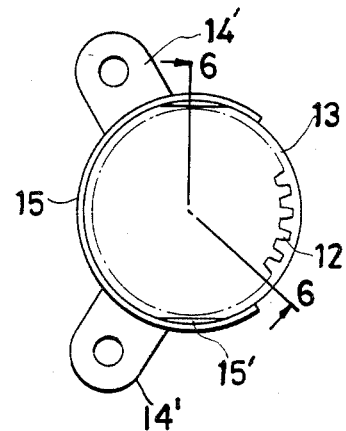
FIG. 5 is a front view of a second embodiment of the present invention.
Figure 6:
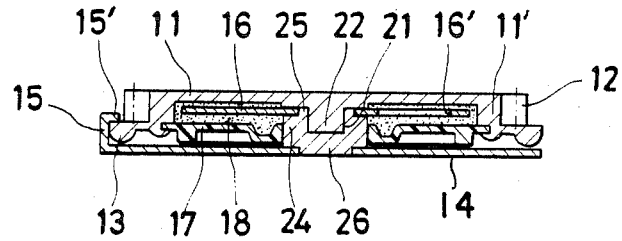
FIG. 6 is a cross section of the second embodiment of the damper as viewed along line 6—6 of FIG. 5.
Figure 7:
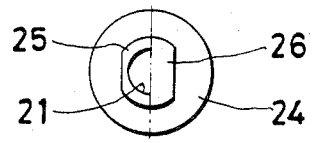
FIG. 7 is an explanatory diagram of a shaft in a stationary disk in the damper of FIG. 5, illustrating a top view thereof in one half and a bottom view thereof in the other half.

FIGS. 5-6 illustrate a second embodiment of this invention, in which a stationary disk and a shaft are formed separately of each other. The shaft 24 is provided at one end of the circular shaft portion thereof fitted into the central hole of the seal disk with a projecting part 25 of a non-circular cross section identical in shape with the cross section of the non-circular hole formed at the center of the stationary disk and at the other end of the circular shaft portion with a shaft portion 26 of an identical non-circular cross section extended into the non-circular hole of the base. Moreover, the cap is provided at the center of the inner surface thereof with a similar protuberance 22 and the shaft 24 is provided with a central depression 21 opening into the leading end of the non-circular projecting part 25.

The oil type damper of this embodiment, therefore, is assembled by setting the stationary disk within the cap, fixed the seal disk as by swaging to the lower surface of the cap, passing the shaft 24 through the central hole of the seal disk with the non-circular projecting part 25 adjusted to the non-circular hole at the center of the stationary disk, then adjusting the direction of the non-circular shaft 26 to that of the non-circular hole of the base, and pushing the cap down into the cylindrical wall. The oil type damper of this construction functions similarly to that of the preceding embodiment.

In the first embodiment, the oil type damper is made of a plastic material because the stationary disk and the shaft are formed integrally with each other. In this case, the stationary disk requires a certain degree of a thickness so as to have the required rigidity. In the second embodiment, since the stationary disk and the shaft are formed independently of each other, the stationary disk can be formed of a thin metallic plate and the overall height of the damper can be proportionately decreased, although the number of components parts is increased by one.

Optionally, the stationary disk may be provided with notches or a hole 16' as occasion demands.

The cylindrical wall may be in an annular shape as in the first embodiment or in an arcuate shape larger than a semicircle as in the second embodiment.

As described above, since the present invention forms the toothed wheel and the cap integrally with each other and causes the cap to form a housing in combination with the seal disk and enables the cap to be rotatably retained in the cylindrical wall, the number of component parts of the damper is smaller than that in the conventional damper which has the toothed wheel and the cap formed independently of each other. At the same time, the damper can be assembled with increased ease and the damper is finished in a very thin flat structure suitable to be fitted into a very narrow space.

What is claimed is:

1. An oil type damper, comprising a blind cylindrical wall 15 formed integrally with a base having means 14 adapted to be secured to a given machine, a cap 11 set in place within said cylindrical wall 15 and retained rotatably therein, a seal disk 17 provided with a central hole, fixed integrally with said cap to cover the lower surface of said cap and adapted to form a housing in combination with said cap, and oil 18 filling the interior of said housing, said housing accommodating therein a stationary disk 16, said stationary disk being provided with a shaft 20 adapted to restrain the rotation of said stationary disk relative to the rotation of said cap, and said shaft being extended outwardly through a central hole in said seal disk and non-rotatably connected to said base.

2. A damper according to claim 1, wherein said shaft 19 having a non-circular portion 20 for restraining the rotation of said stationary disk is formed integrally with said stationary disk 16.

3. A damper according to claim 1, wherein said shaft 26 for restraining the rotation of said stationary disk 16 is formed independently of said stationary disk 16 and includes a non-circular portion 25 fitted into a complimentry hole of said stationary disk and connected thereto.

* * * * *